(12) United States Patent
Martin (10) Patent No.: US 7,658,390 B2
(45) Date of Patent: Feb. 9, 2010

(54) EXTENDABLE WHEEL BARROW HANDLE ADAPTERS

(76) Inventor: Jeff Martin, 608 Ammerman Pike, Cynthiana, KY (US) 41031

( * ) Notice: Subject to any disclaimer, the term of this patent is extended or adjusted under 35 U.S.C. 154(b) by 4 days.

(21) Appl. No.: 11/807,842

(22) Filed: May 30, 2007

(65) Prior Publication Data
US 2008/0296866 A1    Dec. 4, 2008

(51) Int. Cl.
    B62B 11/00    (2006.01)
(52) U.S. Cl. .................... 280/47.315; 16/422
(58) Field of Classification Search ............ 280/47.31, 280/315, 642, 304.1, 78, 47.11, 47.131, 47.17, 280/47.24, 47.25, 47.3, 47.315, 47.32, 47.34, 280/47.36, 47.371, 47.38; 16/430, 438, 422; 74/145, 147, 544
See application file for complete search history.

(56) References Cited

U.S. PATENT DOCUMENTS

| | | | | |
|---|---|---|---|---|
| 1,310,651 A | * | 7/1919 | DeLong ................... 280/47.11 |
| 1,516,856 A | * | 11/1924 | Johnson ....................... 280/1.5 |
| 2,235,041 A | * | 3/1941 | Ronning ................... 280/47.11 |
| 3,796,439 A | * | 3/1974 | Perego ........................ 280/644 |
| 4,150,851 A | * | 4/1979 | Cienfuegos ............ 297/215.13 |
| 4,354,689 A | * | 10/1982 | Perego ................... 280/47.371 |
| 4,406,338 A | * | 9/1983 | Dunbar ......................... 177/50 |
| 4,589,508 A | * | 5/1986 | Hoover et al. ............... 180/19.1 |
| 5,244,225 A | * | 9/1993 | Frycek ..................... 280/304.1 |
| 5,794,307 A | * | 8/1998 | Overcash et al. .............. 16/427 |
| 5,915,712 A | * | 6/1999 | Stephenson et al. ....... 280/304.1 |
| 6,550,104 B2 | * | 4/2003 | Cacciacarne ................. 16/426 |

* cited by examiner

*Primary Examiner*—Lesley D Morris
*Assistant Examiner*—Levon Fiore
(74) *Attorney, Agent, or Firm*—Stockwell & Smedley, PSC (57) ABSTRACT

Embodiments of the present invention relate to an adapter that fits over a wheel barrow handle that is extendable. By way of this extension, the height of a handle portion of the adapter may be changed so as to change the effective height of the wheel barrow handle. In this way, a user of the wheel barrow can lift the wheel barrow from a more comfortable height.

20 Claims, 8 Drawing Sheets

Fig. 10

EXTENDABLE WHEEL BARROW HANDLE ADAPTERS

BACKGROUND OF THE INVENTION

1. Field of the Invention

The present invention relates generally to an adapter for a wheel barrow handle and more particularly to an extendable wheel barrow handle adapter.

2. Description of Related Art

Wheel barrows are well known and have been used for many years. However, in most instances, a wheel barrow's handles are fixed to the body of the wheel barrow and can be awkward for some users.

Because of height differences and differences in arm lengths, some people find a conventional wheel barrow difficult to use. In particular, when moving a wheel barrow on an incline or decline, many users have to stoop or bend awkwardly to create an effective grip on the wheel barrow. Doing so, especially for long periods of time, can lead to a sore back, sore hands and other infirmities.

Also, the leverage for lifting a wheel barrow is sometimes difficult to provide using handles which extend straight away from the body of the wheel barrow. Thus, there exists in this field a need for wheel barrow with handles that are adjustable in height and that can be arranged to help provide additional leverage for lifting the wheel barrow.

BRIEF SUMMARY OF THE INVENTION

Embodiments of the present invention relate to an adapter that fits over a wheel barrow handle that is extendable. By way of this extension, the height of a handle portion of the adapter may be changed so as to change the effective height of the wheel barrow handle. In this way, a user of the wheel barrow can lift the wheel barrow from a more comfortable height. Other embodiments relate to a wheelbarrow with such an adapter integrally manufactured into the handles.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
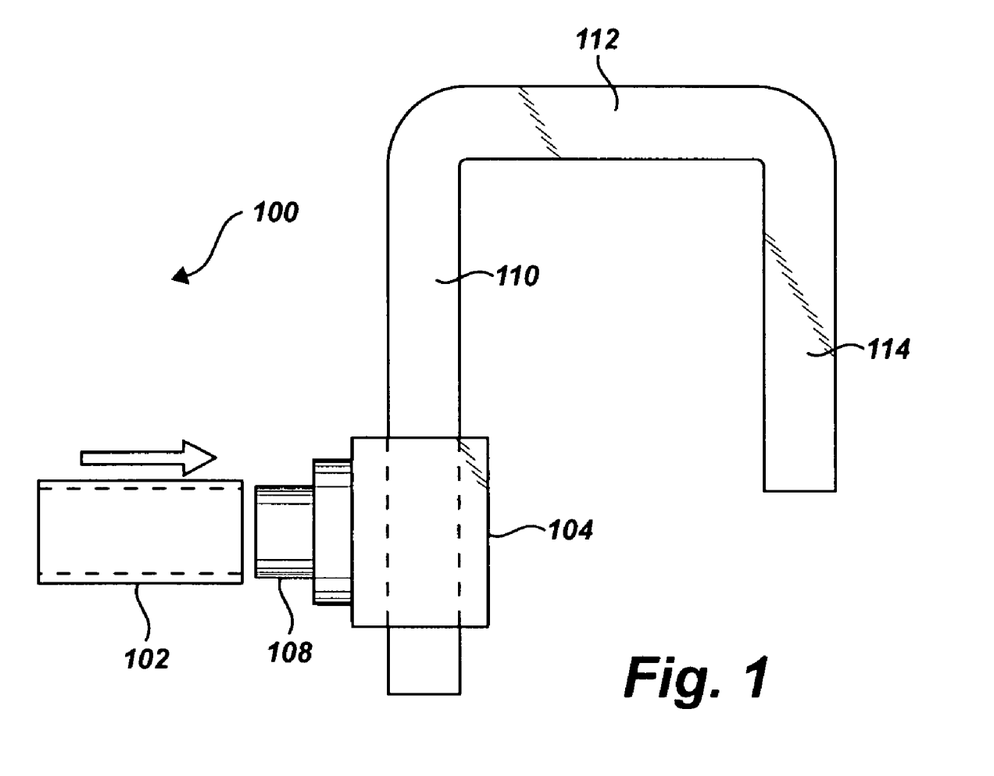
FIG. 1 Depicts a handle adapter in accordance with the principles of the present invention.

FIG. 1 depicts a wheelbarrow handle adapter in accordance with the principles of the present invention. In particular, a sleeve 102 is provided in which a wheel barrow handle is inserted (from the left in this figure). The sleeve 102 is shown separately from the remainder of the adapter for purposes of clarity. However, in operation, the sleeve 102 is fixed to a receiver portion 108 during manufacture.

As shown, the sleeve 102 is a hollow cylinder and fits over the receiver 108. The receiver 108 includes a main body 104 that fits over a handle. The handle includes a vertical portion 110 that connects to a horizontal portion 112 and then to another vertical portion 114. As explained later, the main body 104 can slide up and down the vertical portion 110 so that the relative height of the horizontal (handle) portion 112 can be adjusted.

Although shown as circular in this figure, one of ordinary skill will recognize that the handle portions of the present invention are not limited to any particular shape and neither is the shape of the main body 104 or receiver 108. Square, oval, and cylindrical material can be used without departing from the scope of the present invention. As for the materials, the adapter can be made of any strong material such as steel that will withstand the rigors of use and the environment in which wheel barrows are traditionally used. Mild to heavy gauge steel for example may be used to provide different levels of durability. Also, the different portions of the handle are depicted at nearly right angles to one another. However, such an angle is provided by way of example only and the handle portions may have different relative angles, or have rounded transitions, without departing from the scope of the present invention.

The sleeve 102 is designed so that it can accept about 6 to 8 inches of a wheel barrow handle. Such a size allows for a secure and strong connection between the wheel barrow handle and the adapter.

Figure 2:
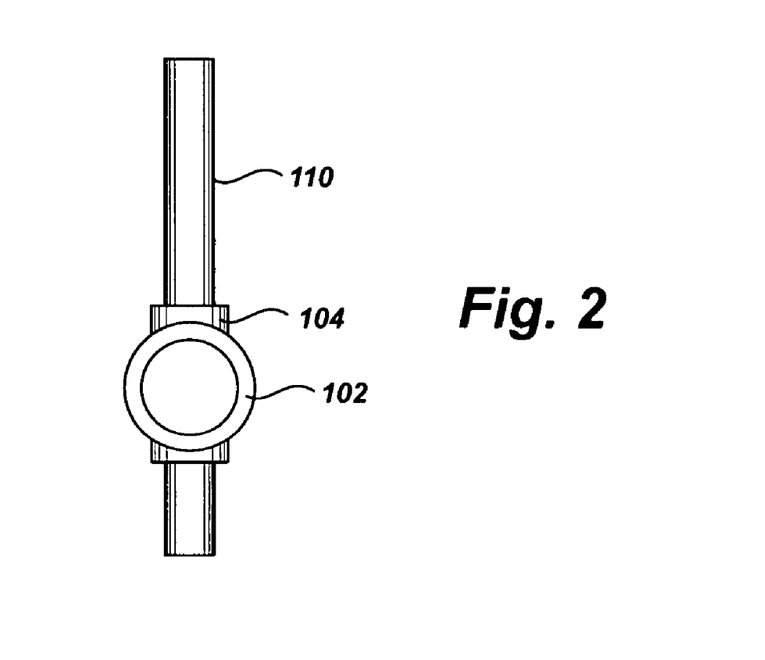
FIG. 2 depicts another view of the handle adapter of FIG. 1.

FIG. 2 provides a front view of the adapter of FIG. 1 that more clearly shows the opening of sleeve 102 that accepts the wheel barrow handle. Although the size of the adapter may be varied without departing from the scope of the present invention, one advantageous size is for the vertical portion 110 to be around 8 to 10 inches, the horizontal portion 112 to be about 4 to 6 inches and the second vertical position to be around 6 to 8 inches.

Figure 3:
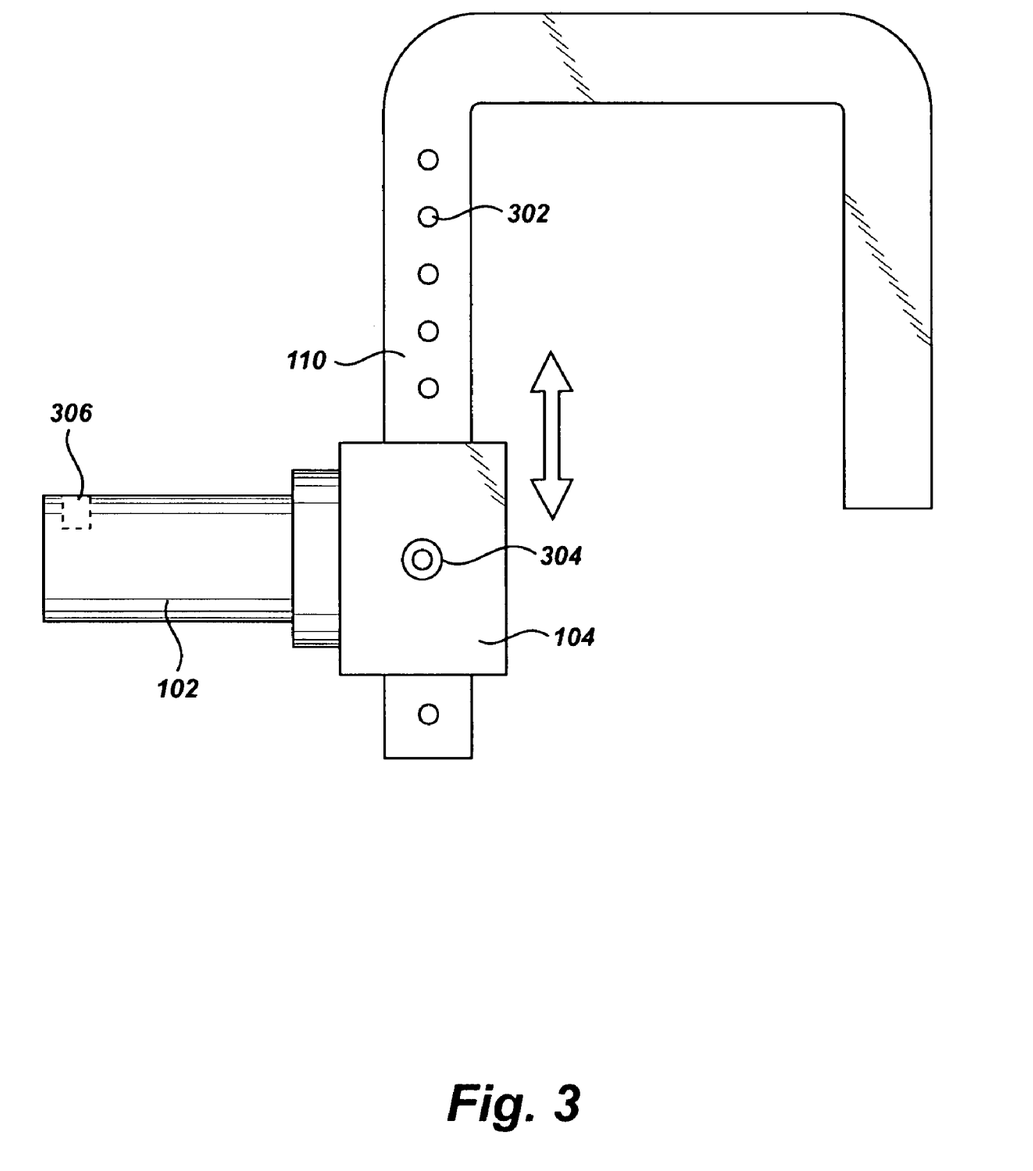
FIG. 3 depicts the handle adapter of FIG. 1 with adjustment holes in accordance with the principles of the present invention.

As shown in FIG. 3, the horizontal portion 110 can include holes 302 that are arranged at, for example 1 inch spacing (although other spacings may be utilized). The different holes 302 align with hole in the main body 104 as the vertical portion 110 is moved up and down relative to the main body 104. A pin 304 is removable in an out of the main body hole and the aligned hole 302 such that the handle adapter can be adjusted to different heights and can be locked into a particular height.

Also shown in FIG. 3 is a hole 306 that allows a screw or bolt or some other fastener to securely hold the sleeve 102 to the wheel barrow handle. One of ordinary skill will recognize that more than one such fastener may be used without departing from the scope of the present invention.

Figure 4:
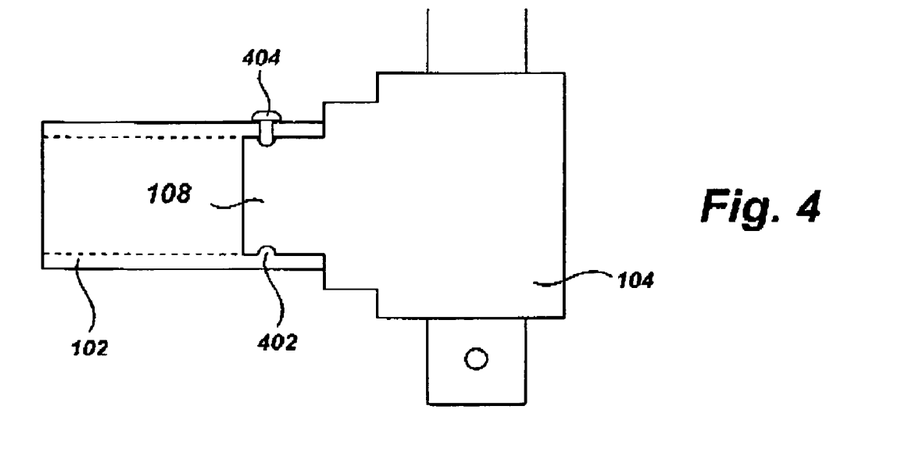
FIG. 4 depicts a detailed view of the rotatable receiver and sleeve of the present invention.
Figure 5:
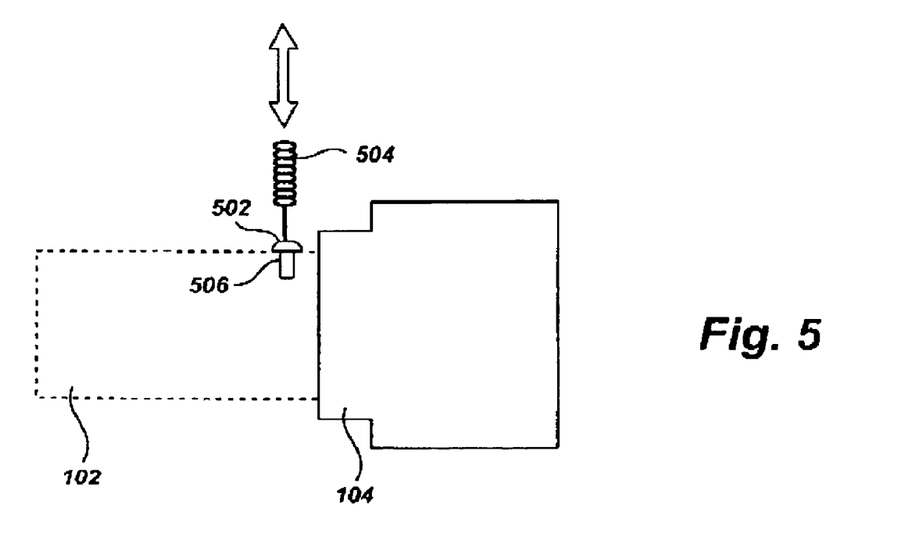
FIG. 5 depicts a locking pin through the sleeve that prevents rotation of the sleeve relative to the receiver.

FIG. 4 depicts the arrangement by which the sleeve 102 and the receiver 108 may rotate relative to one another. A channel 402 may be present in the receiver 108 so that a set pin 404 extends from the inside of the sleeve 102 into the groove 402. The sleeve 102 is thereby prevented from lateral movement relative to the receiver 108 but is free to rotate about the receiver 108. To prevent the sleeve from rotating at all times, however, a pin 502 can be inserted through a hole 506 in the sleeve 102. With the pin 502 engaged in such a hole 506, the sleeve 102 remains stationary. By having more than one hole spaced around the sleeve 102, the handle adapter can be rotated and locked in different positions. As shown in FIG. 5, the pin 502 is arranged to some type of spring or lever that allows a user to engage and disengage the pin 502. The precise mechanism that engages or disengages the spring is not critical to the practice of the present invention. It may be through a throttle cable, a lever, a spring actuated switch, or any of a variety of functionally equivalent means. The critical feature is that the user can easily (with one hand and preferably a thumb) engage and disengage the pin 502 so as to allow/prevent rotation of the main body 104 relative to the sleeve 102.

Figure 6:
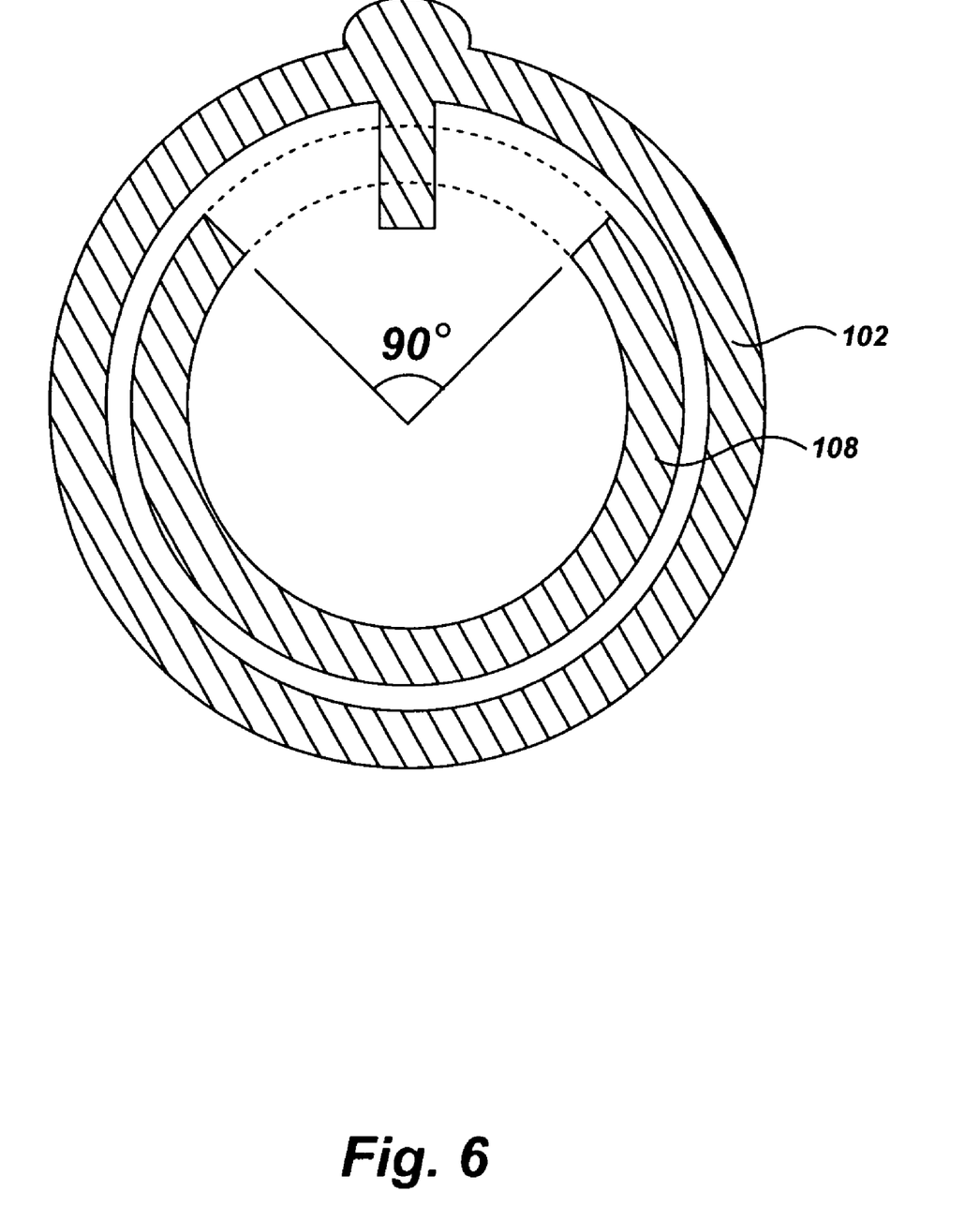
FIG. 6 depicts an alternative coupling of the sleeve and the receiver.

As one alternative to the groove 402 and the pin 404, FIG. 6 depicts one variation in which the sleeve 102 has a fixed pin that fits inside a groove of the receiver 108. The groove is wide enough to allow the pin to move within the groove (so as to allow rotation) but thin enough to prevent unwanted lateral movement between the receiver 108 and the sleeve 102.

Figure 7:
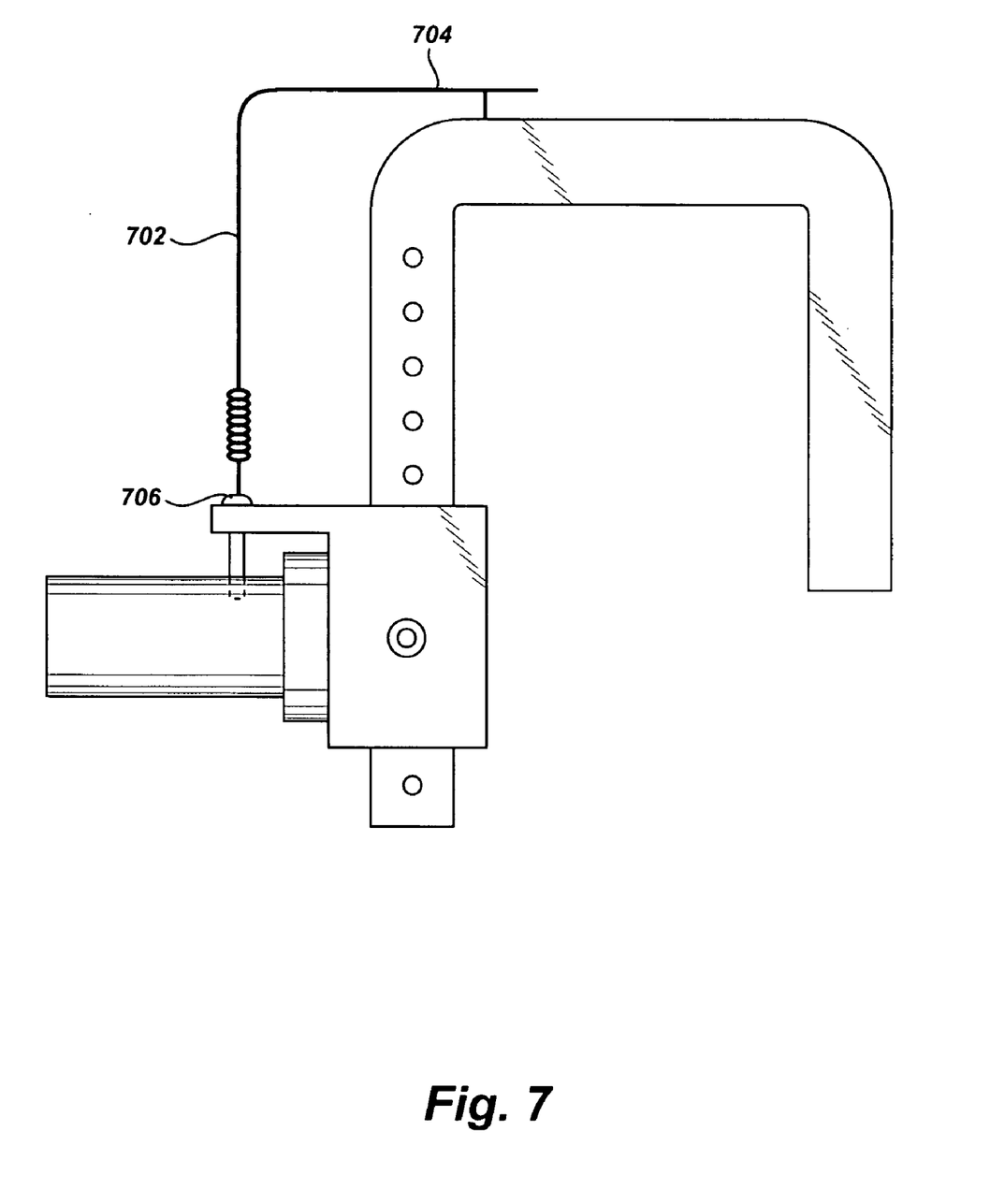
FIG. 7 depicts an embodiment of the present wheelbarrow handle adapter.

As shown in FIG. 7, the pin 706 that prevents rotation is affixed to some type of which or lever 704 that is accessible to a user's hand on the adapter. As mentioned before, the exact spring, lever or cable 702 that is used to manipulate the pin 702 is not critical to the practice of the present invention.

Figure 8:
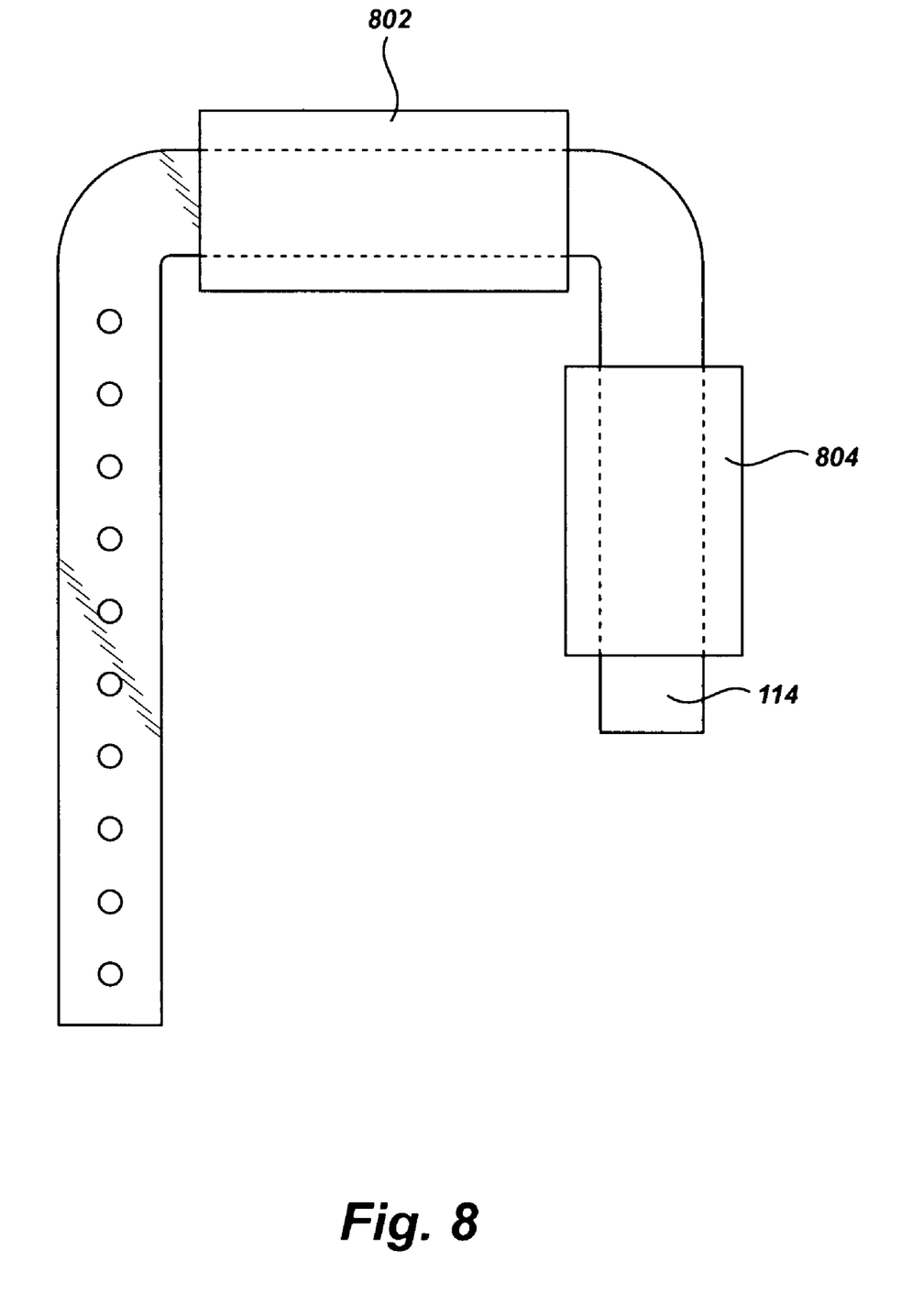
FIG. 8 depicts a handle adapter that includes rotatable portions to provide ergonomic benefits to the gripping portion of the adapter.

In one embodiment the handle or grip portion of the adapter has an outside sleeve 802 that rotates about an inner portion. Also, the handle portion, although not shown in the drawings clearly, may include knurling so as to improve a user's grip on the adapter. When the adapter is rotated, the second vertical portion 114 may be used as a handle and such a rotating sleeve 804 and optional knurling may be used there as well.

Figure 9:
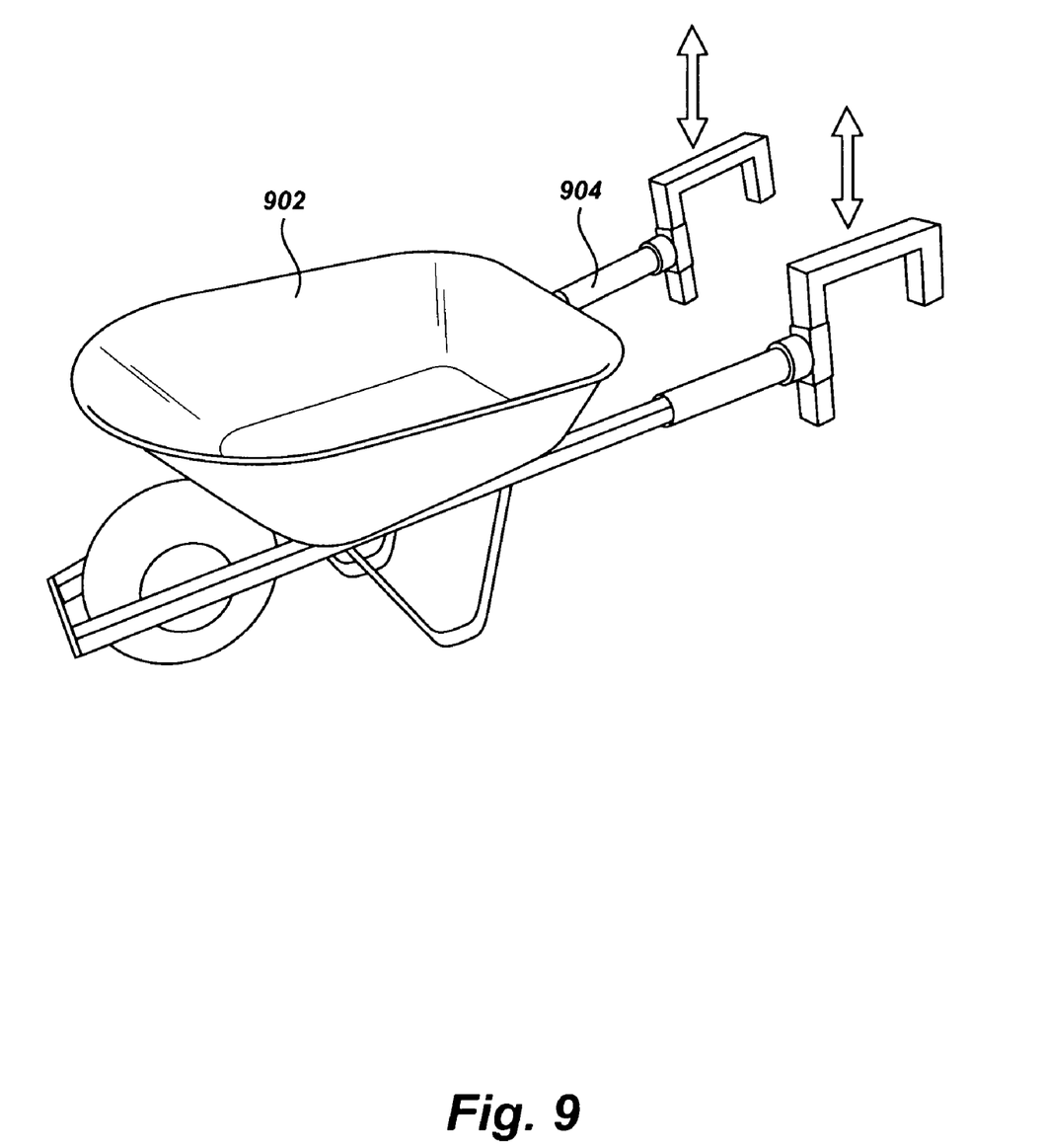
FIGS. 9 and 10 depict the handle adapters installed on a typical wheelbarrow.
Figure 10:
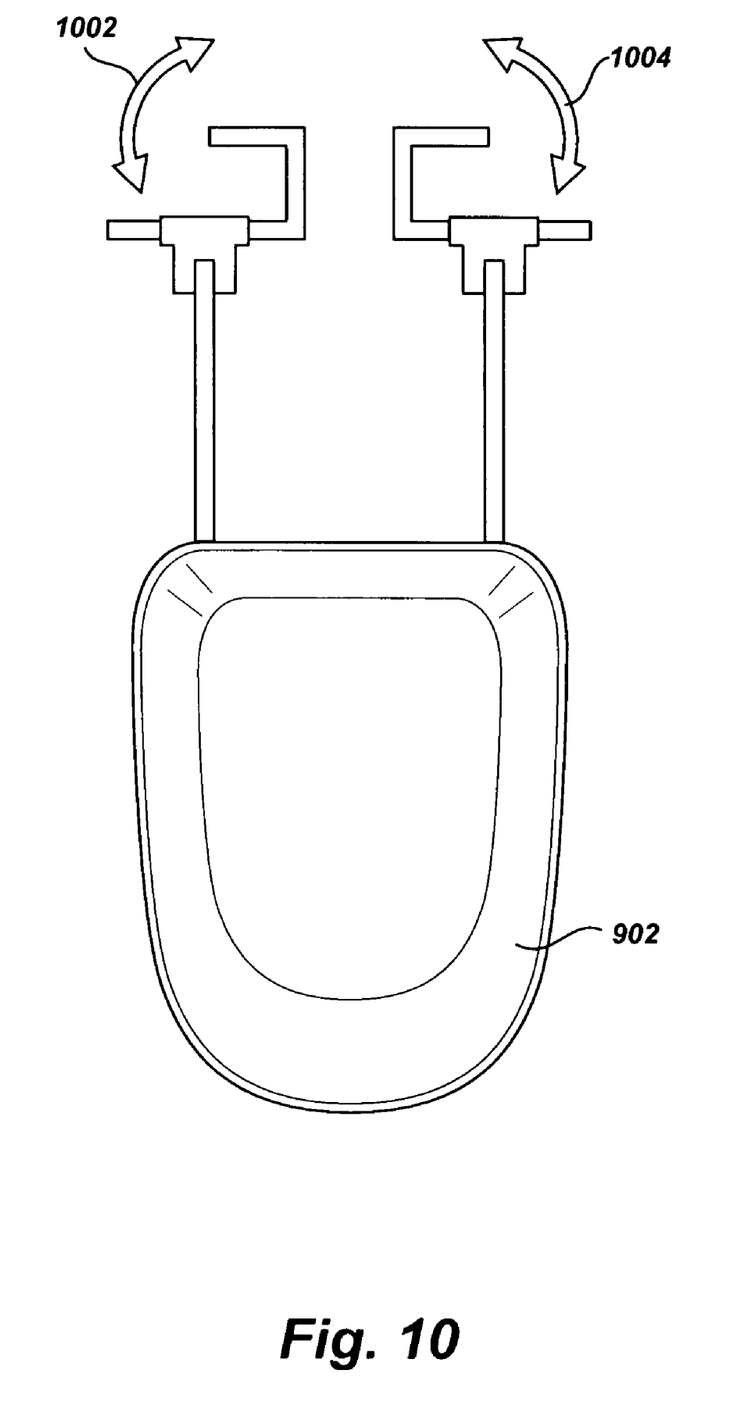

FIGS. 9 and 10 depict the adapter in use with a wheel barrow. FIG. 10 shows the handle adapter fully rotated horizontally so that a user can utilize them to provide more leverage for lifting. Because of the design described earlier, the adapters may be rotated inwardly as shown in FIG. 10 or outwardly as shown by arrows 1002 and 1004. Also, the rotation does not necessarily have to be a full 90 degrees but can be anywhere in-between. Also, although it has been implied until now, there is an adapter for each handle of the wheel barrow as shown in the drawings. Thus, in operation, two adapters are used and not the single adapter shown in the earlier figures.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wheel barrow handle adapter comprising:
    an elongated sleeve having a first end and a second end opposite one another with an opening at the first end configured to receive a wheel barrow handle;
    a receiver coupled to the second end of the elongated sleeve wherein the receiver and elongated sleeve are rotatable relative to one another;
    the receiver including a main body through which a first vertical handle portion passes wherein the main body is slidable along a length of the first vertical handle portion; and
    a horizontal handle portion having a first and second end, the first end attached to the first vertical handle portion and the second end attached to a second vertical handle portion.

2. The wheel barrow handle adapter of claim 1, further comprising:
    a pin configured to pass through a first opening in the sleeve wherein when the pin is in a first position within the first opening the receiver and sleeve are prevented from rotating relative to one another and when the pin is in a second position entirely outside the first opening, the receiver and sleeve are able to rotate relative to one another.

3. The wheel barrow handle adapter of claim 2, further comprising:
    a plurality of openings within the sleeve configured to accept the pin, wherein each opening corresponds to a different rotatable position for the receiver and sleeve.

4. The wheel barrow handle adapter of claim 1, further comprising:
    a plurality of holes located along the first vertical handle portion;
    a receiver hole located in the main body of the receiver;
    a pin configured to pass through the receiver hole and one of the plurality of holes; and
    wherein the receiver hole aligns with different ones of the plurality of holes as the main body slides along the first vertical handle portion such that the pin operates to lock the receiver at different positions along the first vertical handle portion.

5. The wheel barrow handle adapter of claim 4, wherein the plurality of holes pass complete through the first vertical handle portion and the receiver hole passes completely through the main body.

6. The wheel barrow adapter of claim 4, wherein the plurality of holes art evenly spaced.

7. The wheel barrow adapter of claim 2, wherein the pin is coupled to a lever operable to move the pin between the first and second positions.

8. The wheel barrow handle adapter of claim 7 wherein the lever is attached to one of the first vertical handle portion and the horizontal handle portion.

9. The wheel barrow handle adapter of claim 7 wherein the lever is coupled to the pin via one of a spring and a cable.

10. The wheel barrow handle adapter of claim 1 further comprising:
- a handle sleeve configured to be positioned around the second vertical handle portion and rotatable relative to the second vertical handle portion.

11. A wheelbarrow comprising:
- a first handle and a second handle wherein each handle further comprises:
  - an elongated sleeve having a first and second end opposite one another with an opening at the first end configured to receive one of the first and second handles;
  - a receiver coupled to the second end of the elongated sleeve wherein the receiver and elongated sleeve are rotatable relative to one another;
  - the receiver including a main body through which a first vertical handle portion passes wherein the main body is slidable along a length of the first vertical handle portion; and
  - a horizontal handle portion having a first and second end, the first end attached to the first vertical handle portion and the second end attached to a second vertical handle portion.

12. The wheelbarrow of claim 11, further comprising:
a pin configured to pass through a first opening in the sleeve wherein when the pin is in a first position within the first opening the receiver and sleeve are prevented from rotating relative to one another and when the pin is in a second position entirely outside the first opening, the receiver and sleeve are able to rotate relative to one another.

13. The wheelbarrow of claim 12, further comprising:
a plurality of openings within the sleeve configured to accept the pin, wherein each opening corresponds to a different rotatable position for the receiver and sleeve.

14. The wheelbarrow of claim 11, further comprising:
a plurality of holes located along the first vertical handle portion;
a receiver hole located in the main body of the receiver;
a pin configured to pass through the receiver hole and one of the plurality of holes; and
wherein the receiver hole aligns with different ones of the plurality of holes as the main body slides along the first vertical handle portion such that the pin operates to lock the receiver at different positions along the first vertical handle portion.

15. The wheelbarrow of claim 14, wherein the plurality of holes pass complete through the first vertical handle portion and the receiver hole passes completely through the main body.

16. The wheelbarrow of claim 14, wherein the plurality of holes are evenly spaced.

17. The wheelbarrow of claim 12, wherein the pin is coupled to a lever operable to move the pin between the first and second positions.

18. The wheelbarrow of claim 17 wherein the lever is attached to one of the first vertical handle portion and the horizontal handle portion.

19. The wheelbarrow of claim 17 thither comprising:
a handle sleeve configured to be positioned around the second vertical handle portion and rotatable relative to the second vertical handle portion.

20. A wheel barrow handle adapter comprising:
an elongated sleeve having a first end and a second end opposite one another with an opening at the first end configured to receive a wheel barrow handle;
a receiver coupled to the second end of the elongated sleeve;
the receiver including a main body through which a first vertical handle portion passes wherein the main body is slidable along a length of the first vertical handle portion;
a horizontal handle portion having a first and second end, the first end attached to the first vertical handle portion and the second end attached to a second vertical handle portion;
a plurality of holes located along the first vertical handle portion;
a receiver hole located in the main body of the receiver;
a pin configured to pass through the receiver hole and one of the plurality of holes; and
wherein the receiver hole aligns with different ones of the plurality of holes as the main body slides along the first vertical handle portion such that the pin operates to lock the receiver at different positions along the first vertical handle portion.

* * * * *